United States Patent
Jaeger et al.

(10) Patent No.: US 8,348,586 B2
(45) Date of Patent: *Jan. 8, 2013

(54) LOW CENTER OF GRAVITY CARRIER

(75) Inventors: David Jaeger, Oregon, OH (US);
Ronald B Nespor, Greenville, PA (US)

(73) Assignee: Miller Industries Towing Equipment Inc, Ooltewah, TN (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/612,756

(22) Filed: Nov. 5, 2009

(65) Prior Publication Data

US 2010/0047046 A1 Feb. 25, 2010

Related U.S. Application Data

(63) Continuation-in-part of application No. 12/129,917, filed on May 30, 2008, now Pat. No. 8,070,411.

(51) Int. Cl.
*B60P 1/16* (2006.01)
*B60P 1/30* (2006.01)

(52) U.S. Cl. ............ 414/477; 280/6.151; 414/480; 414/494

(58) Field of Classification Search .......... 280/6.15, 280/6.151; 414/477, 478, 480, 494, 538
See application file for complete search history.

(56) References Cited

U.S. PATENT DOCUMENTS

| | | | | |
|---|---|---|---|---|
| 1,934,129 A * | 11/1933 | Judd | | 267/33 |
| 3,448,879 A * | 6/1969 | Van Der Lely | | 414/505 |
| 3,666,125 A * | 5/1972 | Gano et al. | | 414/718 |
| 4,616,879 A * | 10/1986 | Booher | | 298/10 |
| 4,691,959 A * | 9/1987 | Verner | | 296/182.1 |
| 4,704,062 A * | 11/1987 | Hale | | 414/494 |
| 4,750,856 A | 6/1988 | Lapiolahti | | |
| 4,784,545 A * | 11/1988 | Lawrence | | 410/26 |
| 5,061,147 A | 10/1991 | Nespor | | |
| 5,203,667 A * | 4/1993 | Yoneda et al. | | 414/477 |
| 5,246,329 A * | 9/1993 | Farrell | | 414/478 |
| 5,338,101 A * | 8/1994 | Colip | | 298/17 R |
| 5,871,328 A * | 2/1999 | Pinkston | | 414/477 |
| 6,234,713 B1 * | 5/2001 | Rowe et al. | | 404/116 |
| 7,938,416 B2 * | 5/2011 | Legros | | 280/124.11 |
| 2002/0081182 A1 * | 6/2002 | Harris | | 414/477 |
| 2009/0123260 A1 * | 5/2009 | Howard-Leicester | | 414/475 |

OTHER PUBLICATIONS

Chevron Series 10 Carrier advertisement distributed by Chevron, Inc.
Chassis Suspension Photos.
Chevron Series 10 Brochure.

\* cited by examiner

*Primary Examiner* — James Keenan
(74) *Attorney, Agent, or Firm* — Michael P. Mazza, LLC

(57) ABSTRACT

A carrier having a platform or deck mounted on a subframe tiltable relative to the vehicle chassis. The platform is preferably slidable relative to the subframe. Sufficient clearance is provided such that the subframe is preferably located between the vehicle chassis frame and the rear wheels, and below the top of the chassis frame. The resulting carrier has a platform with a height substantially lower than that of previous carriers, providing it with a lower center of gravity, enabling a reduction in load angle, an increase in payload height, and enhanced dynamic road stability.

16 Claims, 16 Drawing Sheets

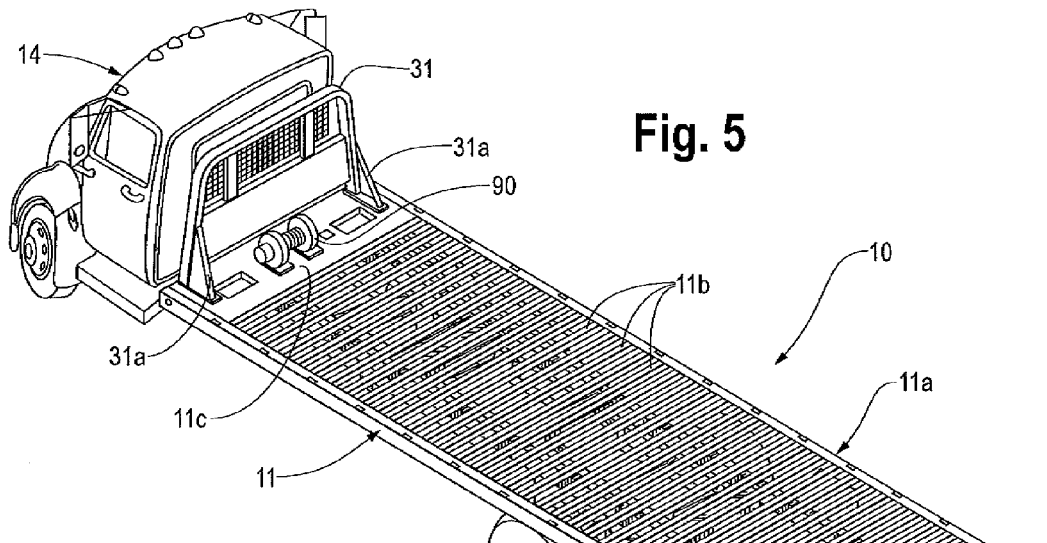
Fig. 5
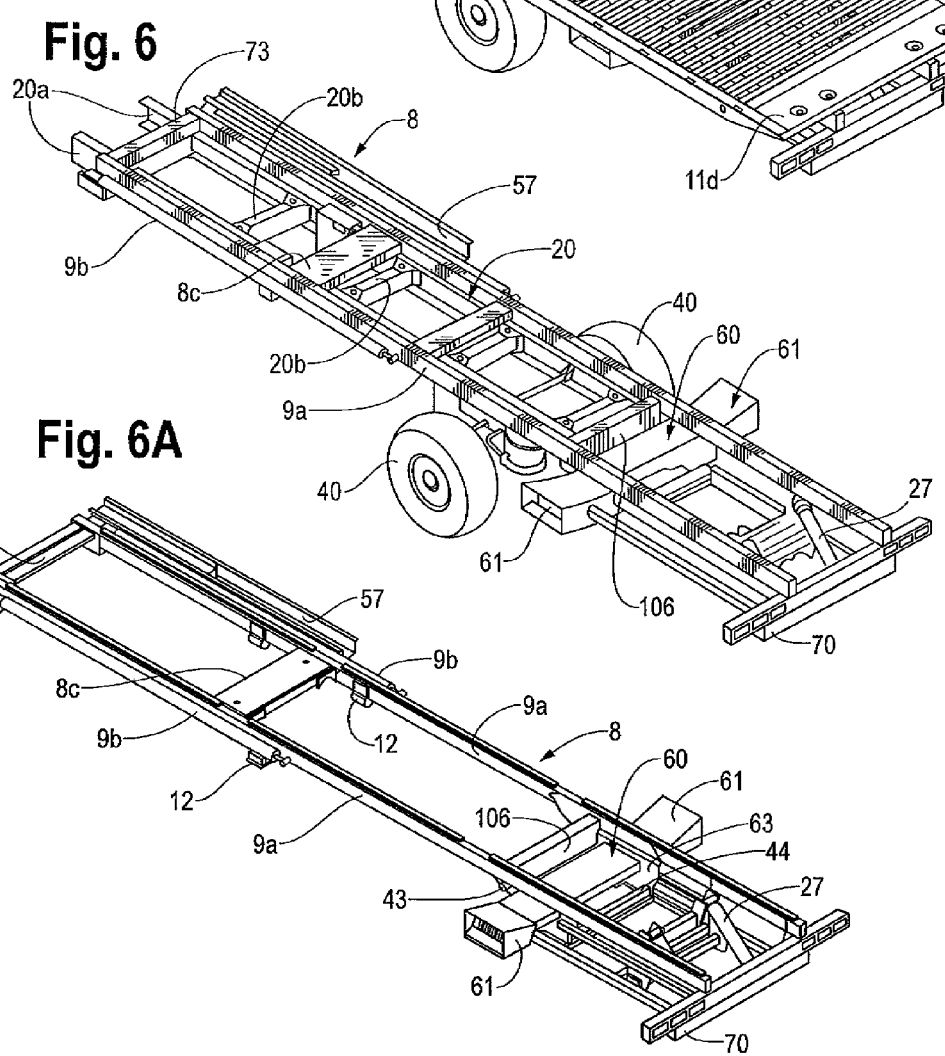
Fig. 6
Fig. 6A

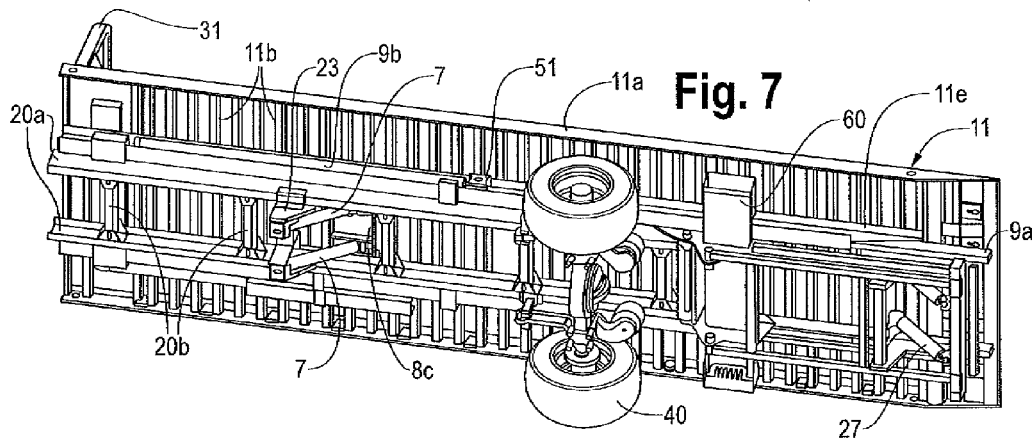
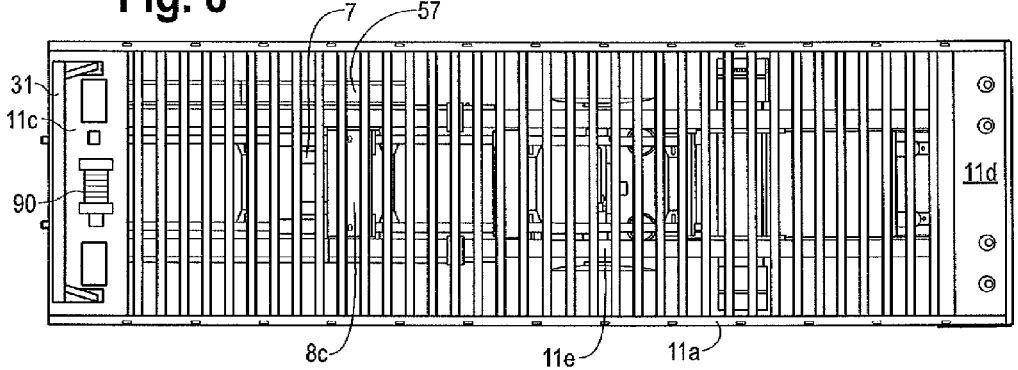
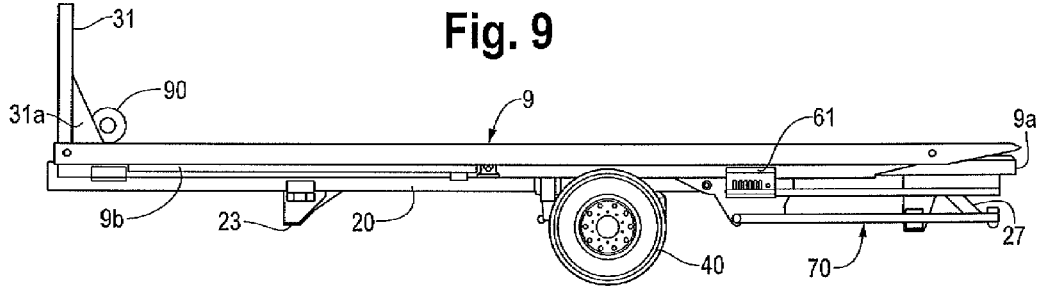
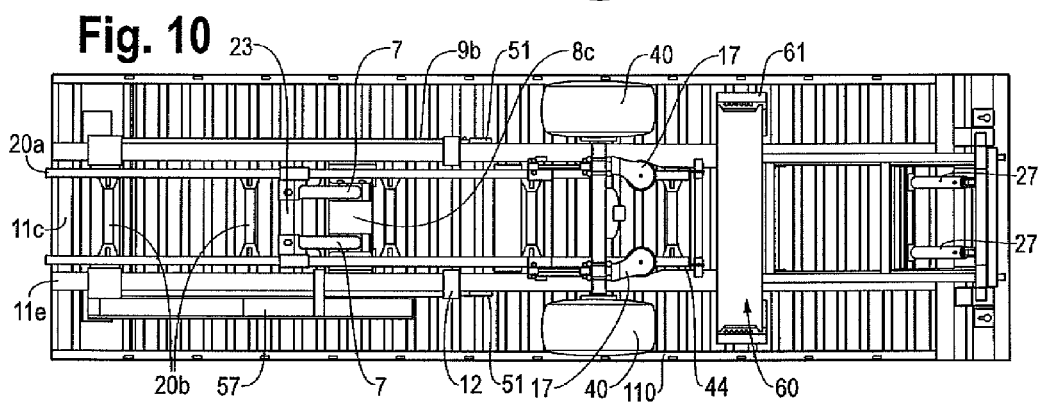

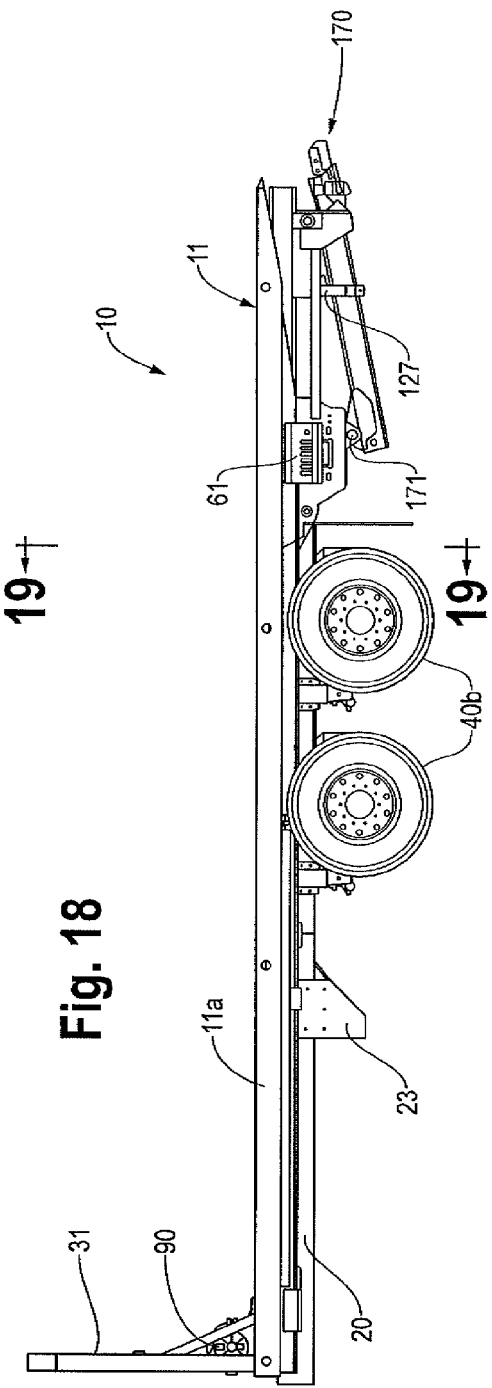
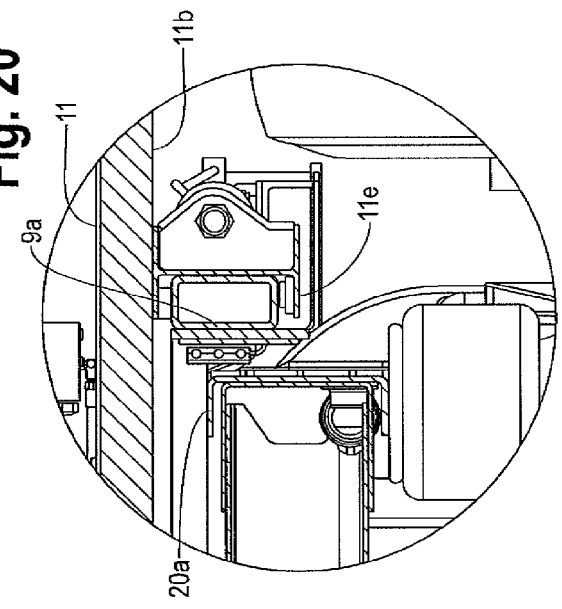
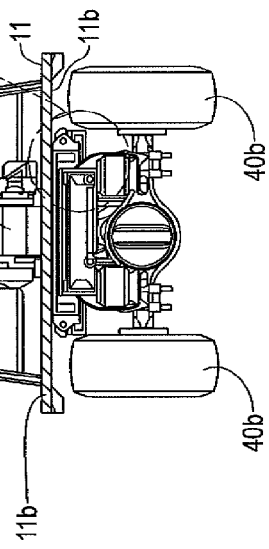

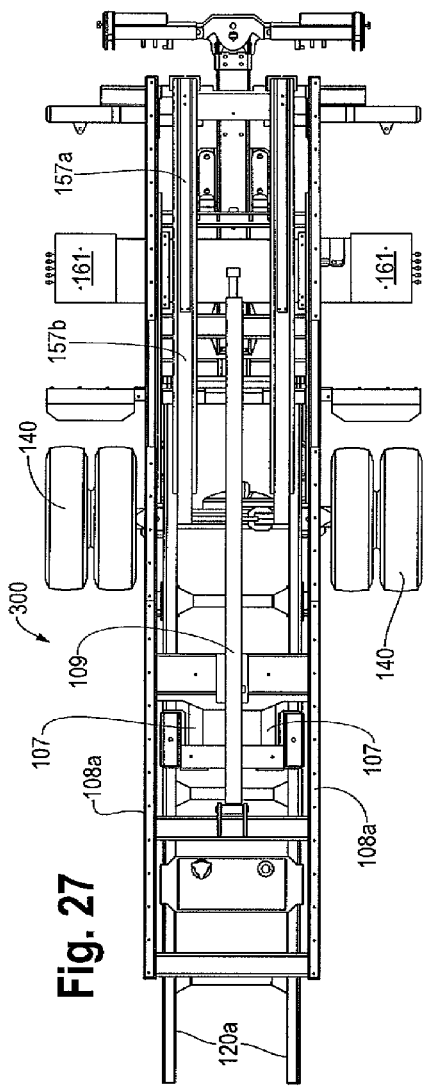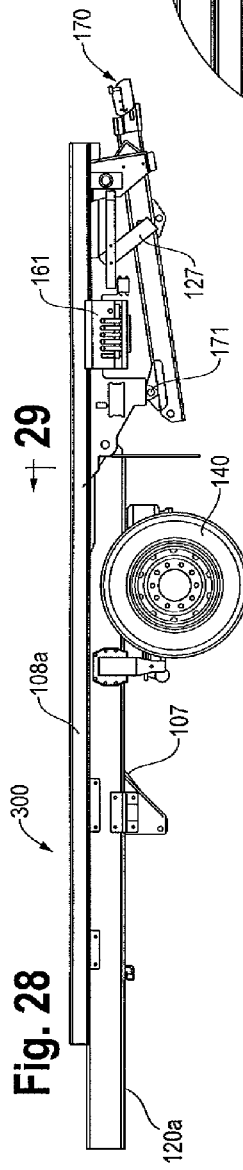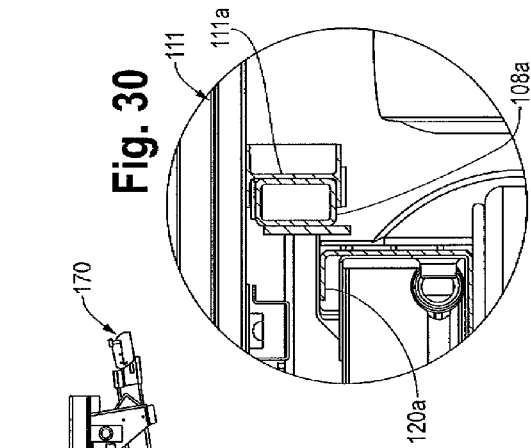

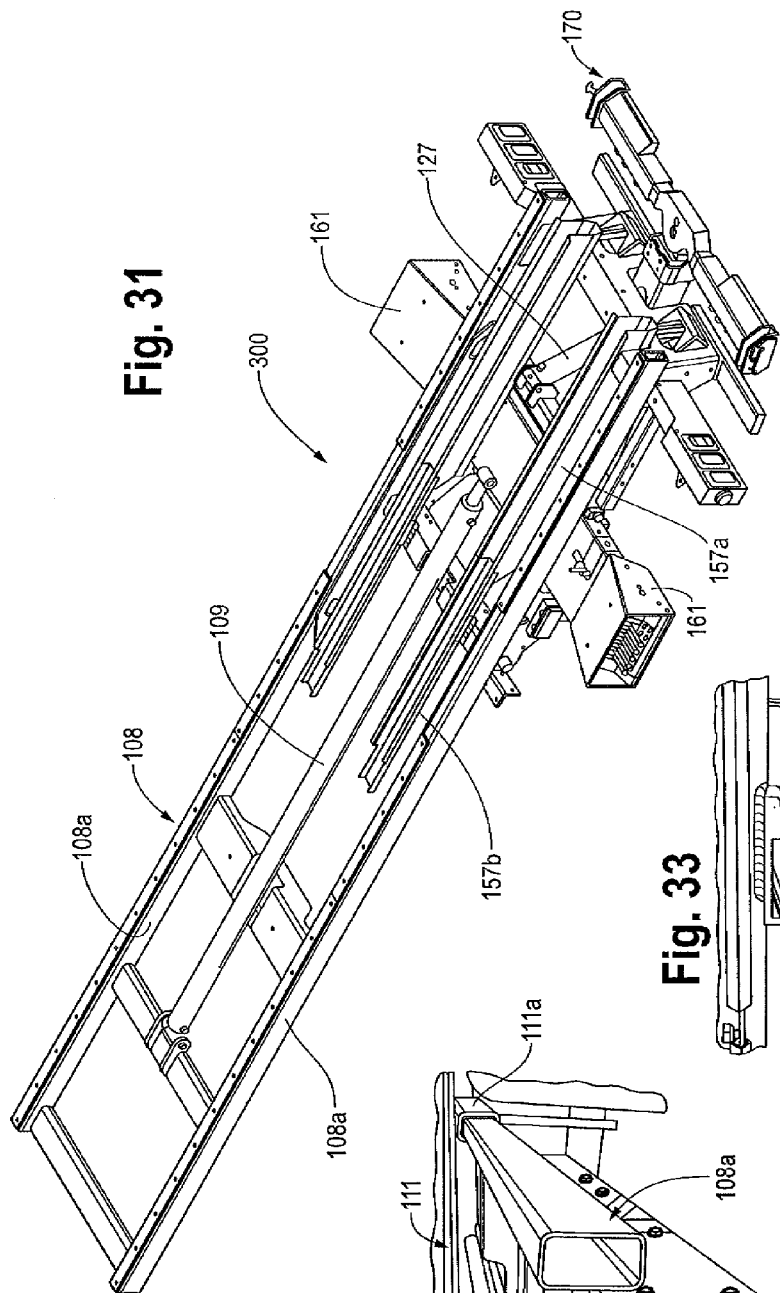
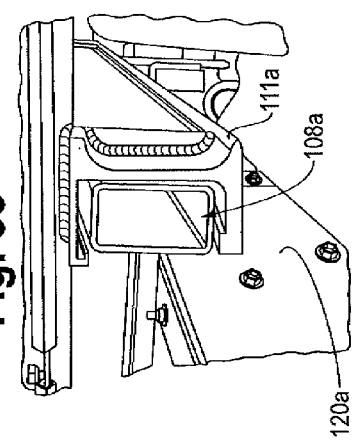
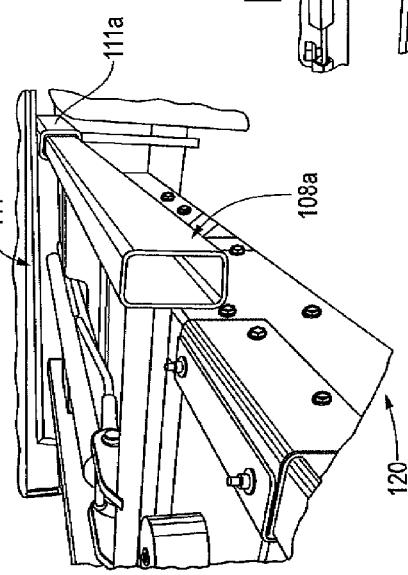

LOW CENTER OF GRAVITY CARRIER

RELATED PATENTS

This application is a continuation-in-part of copending U.S. Ser. No. 12/129,917 filed May 30, 2008 and titled "Low Center Of Gravity Carrier."

U.S. Pat. No. 5,061,147 filed Oct. 29, 1991 and titled "Vehicle Carrier with Wheel Lift" is hereby incorporated by reference in its entirety into this disclosure.

BACKGROUND OF THE INVENTION

The present invention generally relates to tilting bed carriers. More specifically, the invention is directed to the art of tilting bed carriers using a tilting platform having a low center of gravity and relatively small loading angle.

Various carriers, including car carriers as well as industrial carriers (for carrying forklifts, tractors and machines, etc.), are known, as shown in U.S. Pat. No. 4,750,856 ('856 patent) to Lapiolahti and U.S. Pat. No. 5,061,147 ('147 patent) to Nespor. These patents disclose a bed carrier or tiltable platform mounted on a truck chassis which moves from a horizontal position on the truck frame to a tilted position in which the rear end of the bed or platform engages the ground. The tiltable platform of the '856 patent is attached to the frame of a truck chassis, and a hydraulic cylinder tilts the platform rearwardly from the horizontal position to an inclined position by simultaneous upward and rearward movement of the front end of the bed and downward and rearward movement of the rear end of the bed, to enable the loading of a disabled vehicle. The carrier platform of the '147 patent is situated on a subframe with parallel beams that, in a generally similar fashion, support independent sliding and tilting movement of the platform.

Carriers, such as those disclosed in the '856 and '147 patents, utilize a tiltable platform with main longitudinal rails or beams mounted above the truck frame of a dual rear wheel chassis. Conventional commercial truck chassis have been equipped with dual rear wheels in single and tandem axle configurations.

Recently, another truck chassis rear wheel configuration has been developed and commercialized, known as a "Super Single" wheel and tire system. The Super Single wheel system employs one wide wheel and tire on each end of a truck axle, as compared to two narrow wheels and tires on each end of dual-wheeled truck axle. Each style of wheel configuration has advantages and disadvantages. The Super Single wheel configuration is less expensive and provides better fuel economy than dual rear wheel configurations. Dual rear wheel configurations provide redundancy in the event of a single flat tire.

Whatever the axle and wheel configuration, conventional carriers 100 have utilized a truck/vehicle frame chassis 120 including chassis rails 120a which have been located below both the subframe rails 108a as well as below the platform rails 111a, as shown in prior art FIGS. 1-4A. (For background and comparison purposes with the invention to be described below, the carrier shown in FIGS. 1-4 also includes dual rear wheels 140, platform/bed 111 with platform/bed side rails 111a, controls 61, stabilizer 170 tiltable about pivot 171 using cylinder 127, vehicle chassis 108 including subframe rails 108a.)

Dual rear-wheeled chassis have approximately 7 inches of clear space between the tires and the truck frame, whereas the Super Single wheel configuration provides about 12 inches of such clearance. It was discovered that using a Super Single wheel configuration which provides this additional 5 inches of space between the rear wheels and truck frame, together with the use of air bag rear suspensions, enables the location of a carrier's longitudinal slide or platform beams beside the truck frame, and adjacent the rear wheels. This lowers the subframe and sliding platform about 6 inches relative to the top of the truck frame, as compared to conventional carriers.

The Super Single wheel configuration is not currently available on light-duty and medium-duty chassis. Therefore, it would also be advantageous to provide another low center-of-gravity carrier (LCG) design for dual, rear-wheel chassis. The present invention discloses this design, as well, enabling the use of a deck height that is 4-5 inches lower than comparable conventional carriers. As explained below, the carriers of the present invention have a design configuration in which the top of the vehicle/chassis rails is preferably above the bottom of at least one of the subframe rails and the bed/platform rails, and preferably above the bottom of both the subframe rails and the bed/platform rails.

Lowering the subframe and sliding platform about 4-6 inches has several advantages compared to conventional carriers with slide beams located above the truck frame. Typical commercial (e.g.) heavy-duty truck chassis have truck frame heights ranging from 36-44 inches relative to the ground, depending on the size of the truck frame and the type of rear suspension used. Traditional carriers have deck heights about 12-13 inches above the truck frame, which equates to conventional deck heights of about 48-57 inches above the ground. A lower tiltable platform height translates into a lower center of gravity, since the deck height relative to the ground is now in the range of about 42-51 inches, which provides improved truck handling. More available payload height is also provided. A lower platform height also means that the tiltable platform will have a lower load angle relative to the ground, which can facilitate loading (e.g., a large counterweight on a forklift can be more easily loaded, etc.).

SUMMARY OF THE INVENTION

The objects mentioned above, as well as other objects are solved by the present invention, which overcomes disadvantages of prior carriers, while providing new advantages not believed associated with conventional carriers.

The carriers of the present invention have a design configuration in which the top of the vehicle/chassis rails 120a is preferably above the bottom of at least one of the subframe rails and the bed/platform rails, and preferably above the bottom of both the subframe rails and the bed/platform rails.

In one preferred embodiment, a carrier is provided with a vehicle chassis and rear wheels supported by an airbag suspension. The carrier includes a subframe with slide rails; the slide rails may be interposed between frame rails of the vehicle chassis and the rear wheels. The subframe is preferably tiltable relative to the vehicle chassis. A platform may be mounted to the subframe. The interposition of the subframe between the frame rails of the vehicle chassis and the rear wheels enables a lowered platform height, a carrier with a lower center of gravity (LCG carrier), and an increase in the payload height in comparison to conventional carriers in which the subframe is located above the frame rails.

Preferably, the rear wheels are Super Single rear wheels, although it may be possible to design an LCG carrier using conventional rear wheels. In an alternative embodiment, the carrier may include rear tandem axles. Using the principles of the present invention, and using current industrial carriers as an example, the payload height may be increased by about 6 inches, for example, from that of a conventional carrier having subframe rails not located between the vehicle chassis and the rear wheels.

To provide maximum clearance for the subframe slide rails, it is preferred that the vehicle chassis utilize an airbag suspension although, particularly in the future, it is possible that this may not be strictly necessary. It was found that using the principles of the present invention, and with current industrial carriers, the load angle of the platform may be reduced from that of a traditional car carrier by about 2°, when using a 28-foot bed and a carrier with an airbag suspension.

Preferably, the platform is also slidable in a generally horizontal direction relative to the subframe. In a preferred embodiment, the subframe may be tiltable using a first set of hydraulic cylinders, and the platform may be slidable using a second set of hydraulic cylinders.

The carrier may employ a winch for facilitating loading of a disabled vehicle onto the platform. Oil for the winch, as well as electrical cable and/or pressurized air, may be supplied by hoses carried by one or more hose troughs; the hose troughs may preferably be located to the rear of the carrier. A hose trough may include two or more separate bays, and each bay may be permitted to carry a separate hose, for example.

A method of using a carrier for towing a disabled vehicle also forms part of the present invention. The carrier includes a vehicle chassis, rear wheels and an airbag suspension. In one preferred method, a subframe is provided with rails located between frame rails of the vehicle chassis and the rear wheels, with the subframe also being located below the top of the truck frame. The subframe is preferably tiltable relative to the vehicle chassis. At least one platform may be mounted to the subframe and slidable relative to the subframe. The subframe may be rotated, when viewed from the side, using hydraulic cylinders to provide the platform in an inclined position. The platform may be slid rearwardly relative to the subframe until a rear of the platform contacts the ground. A disabled vehicle may then be moved onto the platform, and secured to the platform for transport. The platform may then be slid forward, relative to the subframe, for transport, and the subframe and platform may be rotated back to the initial horizontal position.

In another preferred embodiment of the invention, a carrier is provided having a vehicle chassis with frame rails and rear wheels supported by a rear axle suspension. The carrier includes a subframe with rails interposed between the frame rails and the rear wheels of the vehicle chassis. The subframe is preferably tiltable relative to the vehicle chassis. A platform may be mounted to the subframe; the platform may be slidable in a generally horizontal direction relative to the subframe. Subframe rails are preferably interposed between the frame rails of the vehicle chassis and the rear wheels, enabling a lowered platform height and an increase in the payload height in comparison to conventional carriers with subframe located entirely above the frame rails.

In an alternative preferred embodiment, the platform may be supported by platform rails, and at least a portion of the platform rails may be located below the top of the vehicle chassis frame rails. Alternatively, or preferably in addition, at least a portion of the subframe rails are located below the vehicle chassis frame rails. With this embodiment, the payload height may be increased by about 4-5 inches from that of a conventional carrier in which subframe rails are not located between the vehicle chassis and the rear wheels. Using the present invention, the load angle of the platform may be reduced from that of a traditional car carrier by about 2°.

With the present invention, the rear axle suspension may include an airbag suspension, or a leaf spring suspension, and the rear wheels may be either dual rear wheels or Super Single rear wheels.

The subframe may be tiltable using at least one hydraulic tilt cylinder, such as a pair of slideback cylinders or a single, center-mounted cylinder, located between the subframe rails. The platform may be slidable using at least one additional hydraulic cylinder.

The platform may carry a winch for facilitating loading of a disabled vehicle onto the platform. Oil for the winch may be supplied by a pair of hoses carried by one or more hose troughs located to the rear of the carrier. The one or more hose troughs may each include two or more bays with hoses carrying at least one of the following items: oil; electrical wiring; or pressurized air.

In an alternative preferred embodiment of the invention, a carrier is provided with a vehicle chassis and rear wheels supported by an airbag suspension, and a subframe with rails located between frame rails of the vehicle chassis and the rear wheels. The subframe may be tiltable relative to the vehicle chassis. At least one platform may be mounted to the subframe and slidable relative to the subframe. Using the invention, the height of the platform may be substantially lowered in comparison to conventional carriers whose subframe rails are located entirely above the frame rails of the vehicle chassis, enabling an increase in payload height and a reduction in load angle.

The platform may be supported by platform rails, and at least a portion of the platform rails may be located below the top of the vehicle chassis frame rails.

Preferably, at least a portion of the subframe rails are located below the top of the vehicle chassis frame rails.

The carrier of the present invention may include rear tandem axles, which may support Super Single wheels.

In another embodiment of the invention, a method is provided for using a carrier to towing a disabled vehicle. The carrier has a vehicle chassis, rear wheels and a rear axle suspension. The carrier also includes a subframe with rails located between frame rails of the vehicle chassis and the rear wheels. Preferably, the subframe is tiltable relative to the vehicle chassis. At least one platform may be mounted to the subframe and slidable relative to the subframe. The subframe may be rotated to move the platform to an inclined position, such as by using hydraulic cylinders. The platform may be slid rearwardly, relative to the subframe, until a rear of the platform is adjacent to or contacts the ground. Now, a disabled vehicle may be moved onto and secured on the platform. To secure the vehicle during carrier movement, the platform may be slid forward, relative to the platform, and the subframe and platform may be rotated back to the initial horizontal position.

The platform may be supported by platform rails. The subframe may include subframe rails. Preferably at least a portion of the platform rails and at least a portion of the subframe rails are located below the top of the vehicle chassis frame rails.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Payload height" means the vertical distance between the carrier deck and the legal limit of the height above ground. (Federal regulations currently limit the height above ground of a load being transported to 13-feet, 6-inches). As an example, in the specific embodiment of the present invention disclosed here, the payload height can be increased by about 6 inches.

"Load angle" means the angle between horizontal or ground, on the one hand, and the deck surface when the deck is inclined, on the other.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 5 is top and side perspective view of one preferred embodiment of the vehicle carrier of the present invention, a carrier with a heavy-duty vehicle chassis;

FIG. 6 is a top and side perspective view of the vehicle chassis, platform subframe and rear wheels of the embodiment shown in FIG. 5 (i.e., with the platform removed);

FIG. 6A is a top and side perspective view of the subframe of the embodiment shown in FIG. 5;

FIG. 7 is a bottom and side perspective view of the preferred carrier shown in FIG. 5;

FIG. 8 is a top perspective view of the preferred carrier of FIG. 5;

FIG. 9 is a side perspective view of the preferred carrier shown in FIG. 5;

FIG. 10 is a bottom view of the heavy-duty carrier shown in FIG. 5;

FIG. 18 is a side perspective view of a heavy-duty vehicle chassis with a preferred carrier, showing a combination wheel lift and hydraulic stabilizer;

FIG. 19 is a rear view along reference line 19-19 of FIG. 18;

FIG. 20 is an enlarged view of the circled portion of FIG. 19;

FIG. 27 is a top perspective view of the carrier with vehicle chassis of FIG. 26 and including the subframe;

FIG. 28 is a side perspective view of the carrier shown in FIG. 27;

FIG. 29 is a rear view along reference line 29-29 of FIG. 28;

FIG. 30 is an enlarged view of the circled portion of FIG. 29;

FIG. 31 is an enlarged top and side perspective view of the subframe, bays and wheel lift shown in FIG. 27;

FIG. 32 is a partial, enlarged rear and side perspective view of the light/medium duty carrier shown in FIGS. 25-27 and illustrating that the top of the vehicle chassis is above the bottom of the subframe rails; and FIG. 33 is an enlarged view similar to FIG. 32, showing the platform/bed rails as well.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
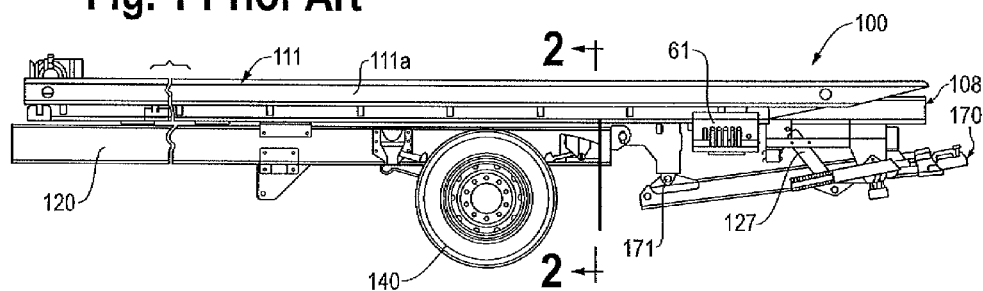
FIG. 1 is a side perspective view of a prior art vehicle carrier.
Figure 2:
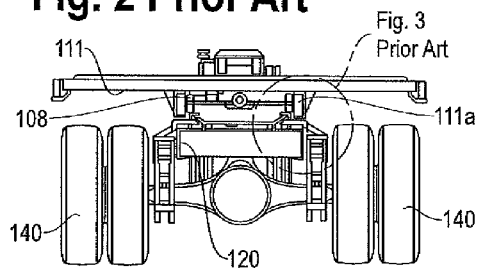
FIG. 2 is a rear view taken along reference line 2-2 of FIG. 1.
Figure 3:
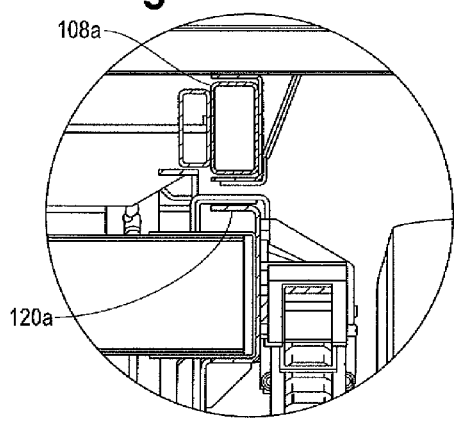
FIG. 3 is an enlarged view of the circled portion of FIG. 2.
Figure 4:
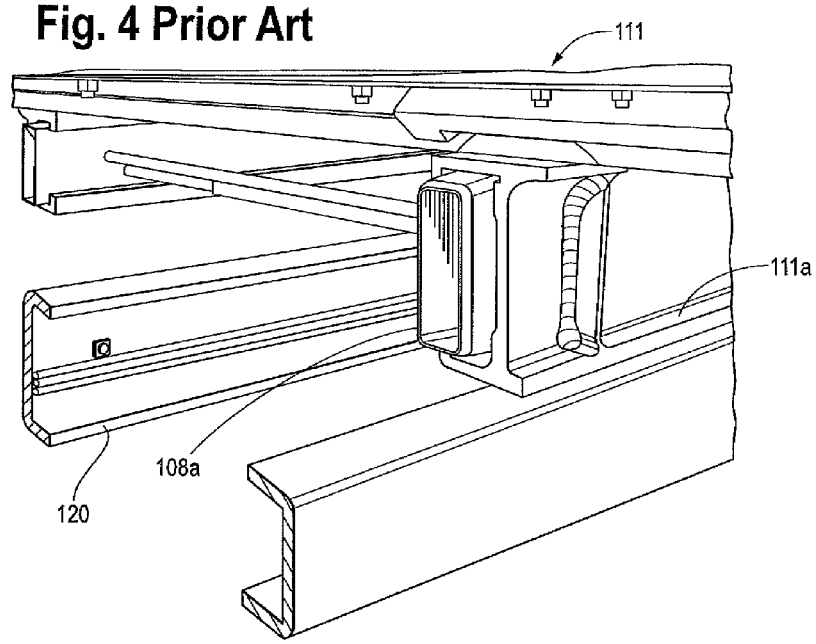
FIG. 4 is a partial side and rear perspective view of a prior art carrier showing the subframe rail and encircling platform/bed rail located entirely above the vehicle chassis rails.
Figure 6B:
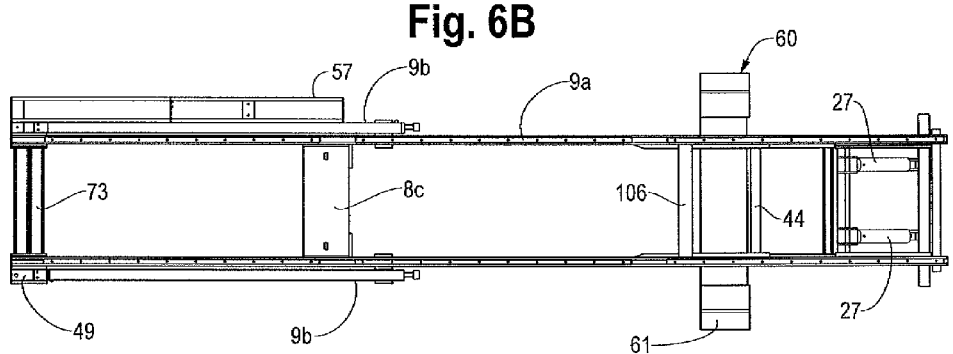
FIG. 6B is a top perspective view of the subframe of the embodiment shown in FIG. 5.
Figure 6C:
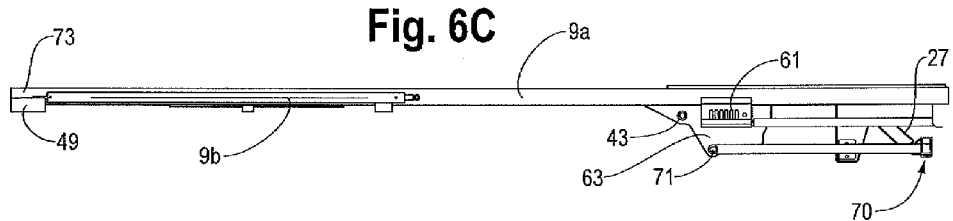
FIGS. 6C and 6D are left and right side perspective views, respectively, of the subframe shown in FIG. 6A.
Figure 6D:
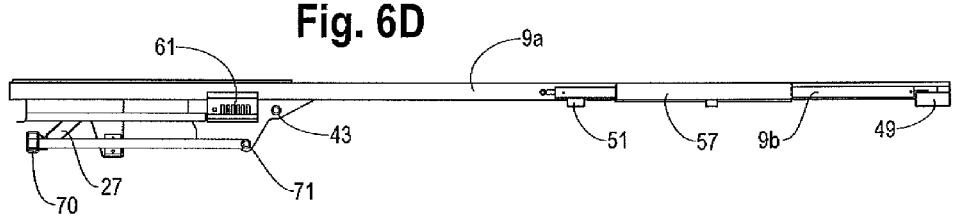
Figure 6E:
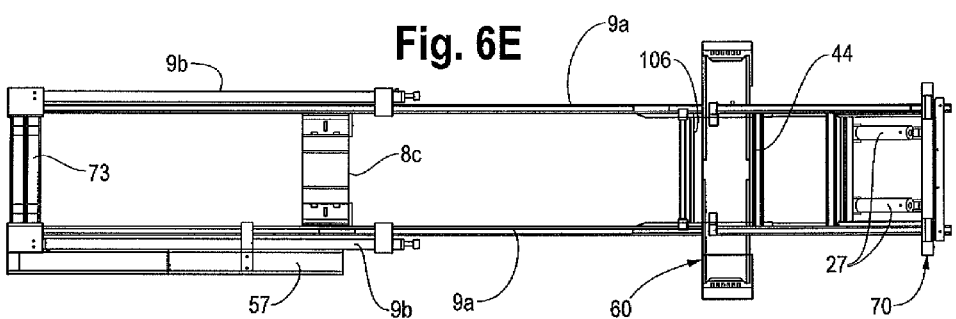
FIG. 6E is a bottom perspective view of the subframe shown in FIG. 6A.
Figure 6F:
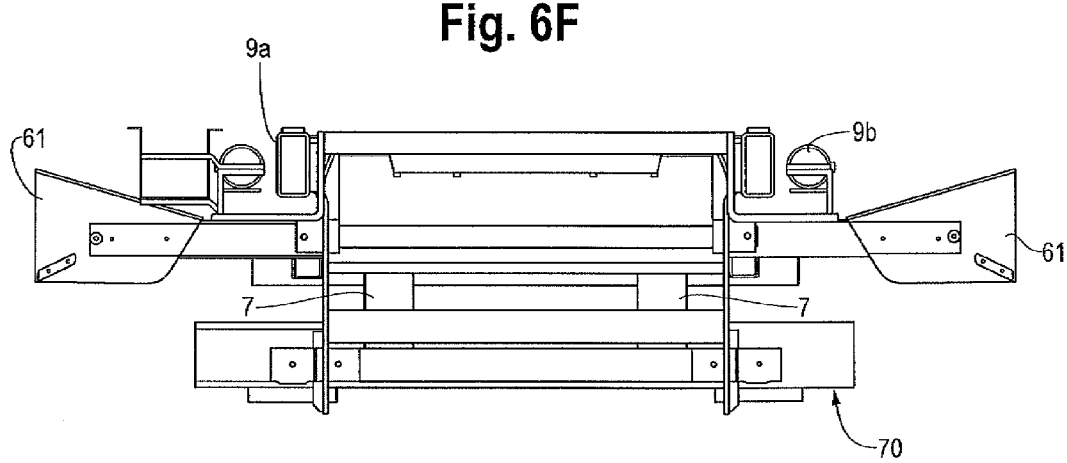
FIGS. 6F and 6G are front and rear perspective views, respectively, of the subframe shown in FIG. 6A.
Figure 6G:
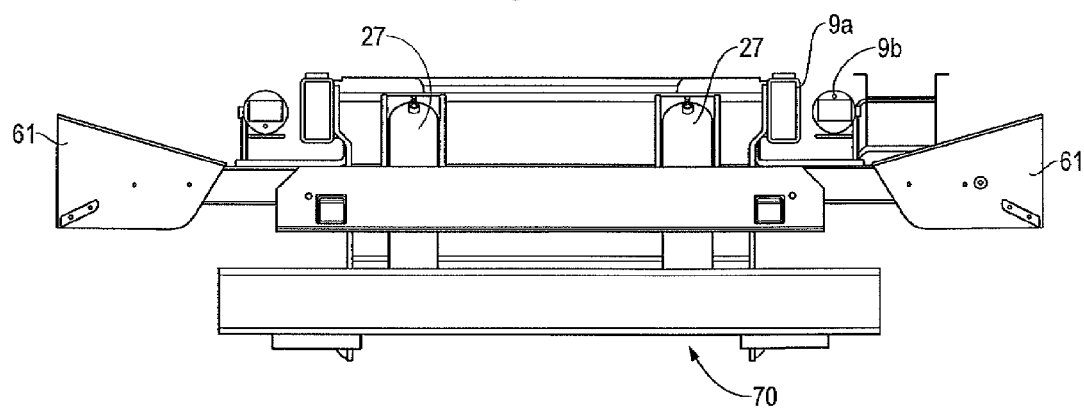

Referring first to FIGS. 5, 6 and 6A, a preferred embodiment of carrier 10 includes vehicle cab 14 pulling slidable and tiltable platform 11. Rear of the cab, cab protector bar 31 may be supported on platform 11 by weldments 31a on the platform. Platform 11 may be supported by subframe 8, which may be positioned adjacent to and attached to vehicle chassis 20 as explained below.

Referring to FIGS. 5-6, vehicle chassis 20 may include opposing longitudinal chassis rails 20a, supported by chassis crossmembers 20b. Super Single rear wheels 40 may be mounted as shown. Subframe 8 may be positioned, in novel fashion, with subframe rails 9A located between rear wheels 40 and vehicle chassis rails 20a, enabling the subframe to be located nearer to the ground than previously possible.

Referring to FIGS. 5, 7-10, platform 11 may include platform/bed side rails 11a, platform cross-members 11b, front and rear platform portions 11c, 11d, and platform slide rails 11e, respectively.

Figure 13:
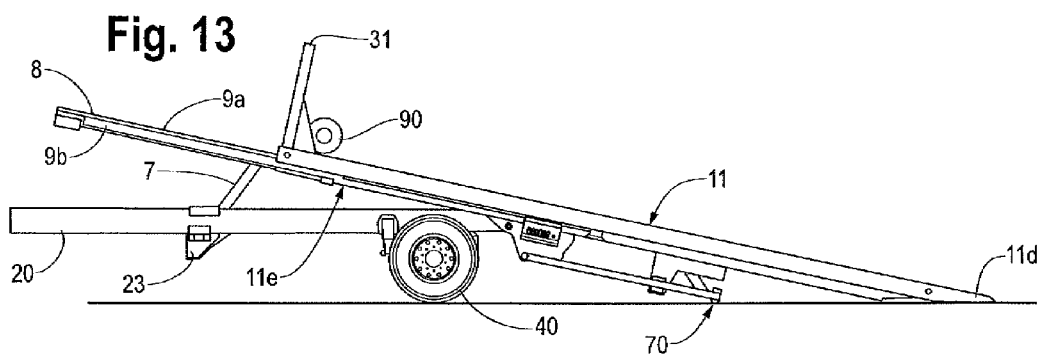
FIG. 13 is a side perspective view of FIG. 12.
Figure 21:
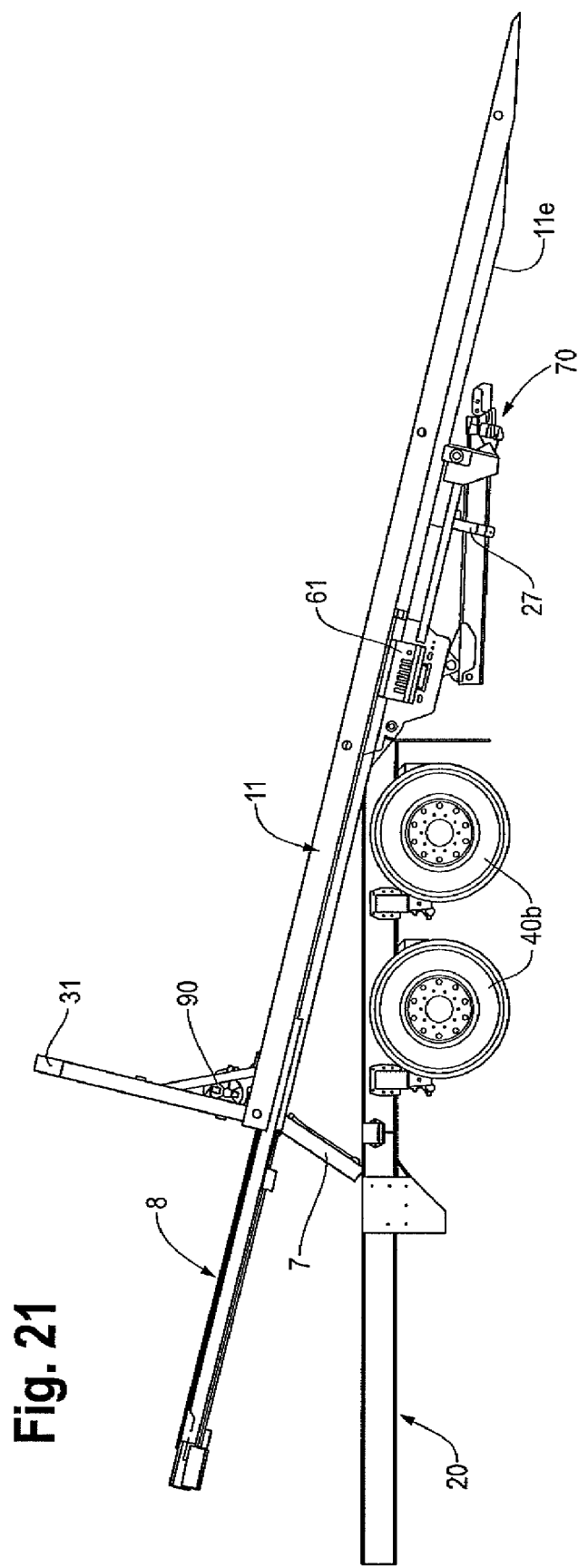
FIG. 21 is a side perspective view of the embodiment shown in FIG. 19, showing the platform subframe slid rearwardly along the chassis.

Preferably, platform or bed 11 may be slidable relative to subframe 8, and may be tiltable relative to vehicle chassis 20, as now explained. When the carrier is not loaded, in a preferred embodiment the sliding and tilting functions may occur independently at different times, or simultaneously, at the operator's discretion. The sliding function will be discussed first. Referring to FIGS. 6 and 6A, slideback cylinders 9b may be extended and retracted to actuate sliding movement of the bed relative to the subframe, as shown in FIGS. 13, 15 and 21. (FIGS. 7-10 are shown with the floor plate, a flat piece of steel forming the upper, work surface of the platform, removed to better show the top details.) Cylinders 9b may be rigidly attached at a forward end to the subframe (e.g., plate 49 of FIG. 6A), and at a rearward end to the bed (e.g., at a pinned connection such as slideback cylinder mounts 51 on the bed (FIGS. 7 and 10). When slideback cylinders 9b are fully extended, to counter their natural sagging tendency, they may be supported by slideback cylinder supports 12 (FIG. 6A).

Referring now to FIGS. 6, 9 and 13, the tiltable function of the subframe, and thus the deck mounted to it, will now be described. Subframe 8 includes opposing subframe slide rails 9a, front subframe crossmember 73, and cylinder box 8c. Hinge plate crossmember 106 (FIGS. 6A and 6B) may be welded to the subframe. Subframe 8 may pivot about bushings 43 on hinge plate 63 (see FIGS. 6A and 6C). Bushings 43 may be welded to hinge plate 63. Hinge plate 63 may be rigidly attached to subframe slide rails 9a, as shown in FIG. 6A, enabling the subframe to pivot relative to the truck chassis.

Figure 15A:
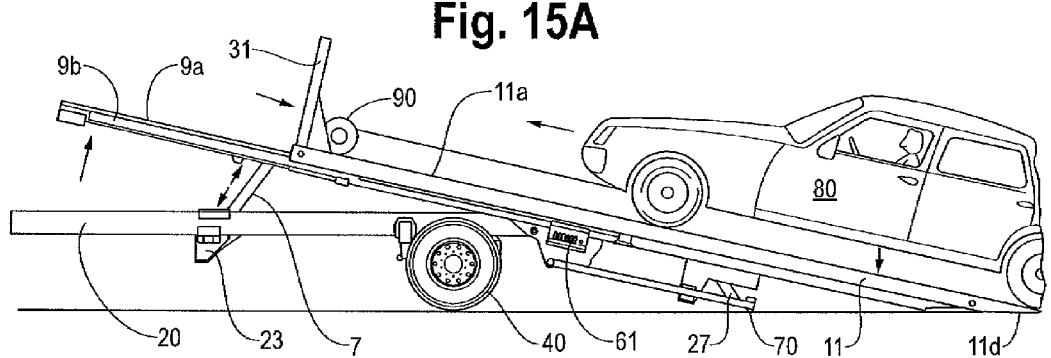
FIGS. 15A-15C are side perspective views showing a disabled vehicle being winched up the inclined platform (FIGS. 15A-15B) and then in the horizontal, stored position (FIG. 15C)
Figure 15B:
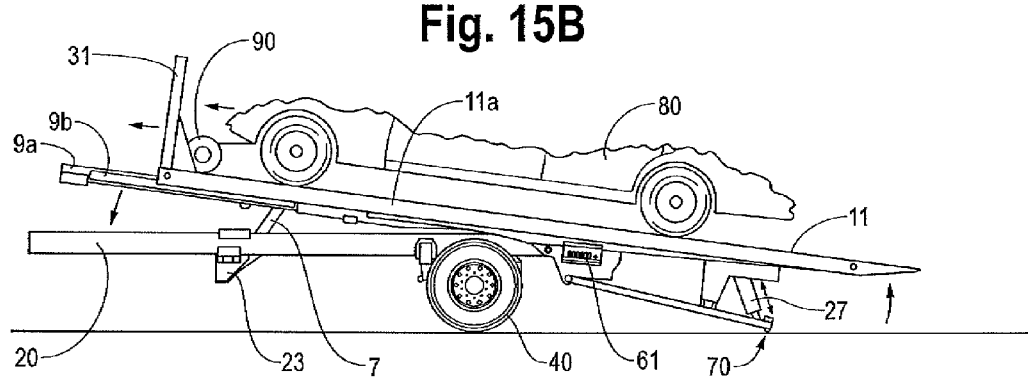
Figure 15C:
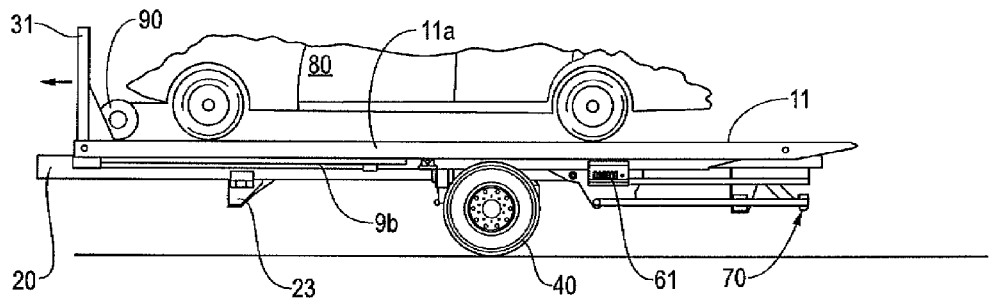
Figure 16:
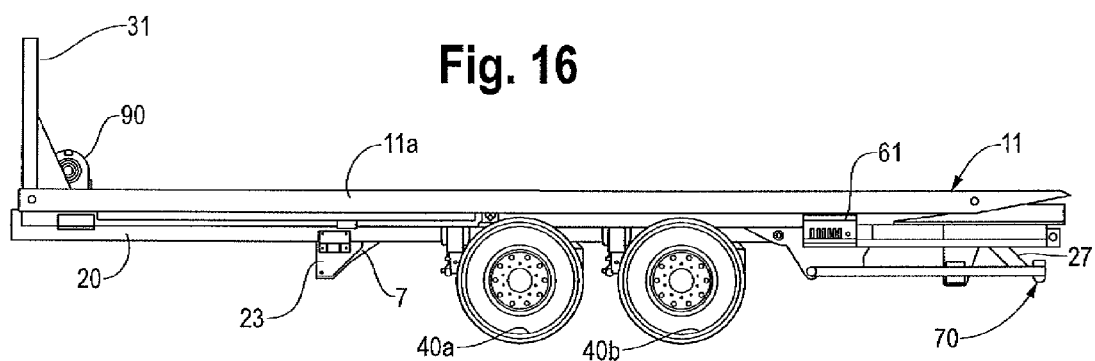
FIG. 16 is a side perspective view similar to FIG. 9, showing a tandem axle carrier with dual pairs of rear wheels, using a heavy-duty vehicle chassis.
Figure 17:
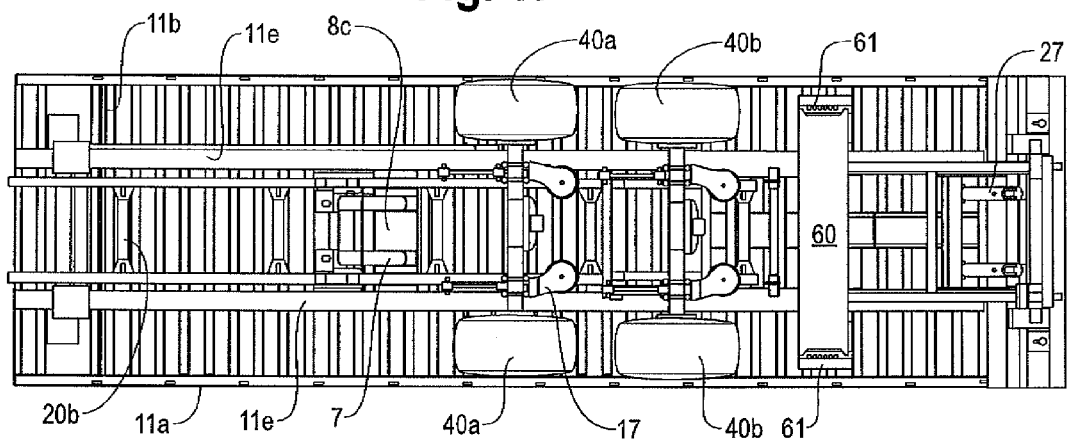
FIG. 17 is a bottom perspective view of the tandem axle carrier shown in FIG. 16.

Tilt cylinders 7 may be extended to tilt the subframe and bed combination clockwise as shown in FIGS. 15A-15C, and retracted to rotate the bed back counterclockwise to a horizontal position. Referring to FIGS. 7, 9 and 10, the lower, forward end of the tilt cylinders may be pivotally attached to saddles 23, while the upper, rearward end of the tilt cylinders may be pivotally attached to cylinder box 8c of the subframe 8.

Referring to FIGS. 6 and 6A, a pair of control stations 61 may be attached to the subframe, such as by attachment to subframe crossplate 60. Control stations 61 may include opposing handles or control levers so that an operator may control various functions from either side of carrier 10, such as platform sliding, subframe tilting, winching, or the function of various devices which may be connected at the rear of the carrier, such as hydraulic stabilizers, wheel lifts, etc.

Referring to FIGS. 15A-15C, the appropriate sequence for loading the carrier is as follows. First, the subframe/deck combination is tilted using hydraulic tilt cylinders 7 until rear stabilizer 70 contacts the ground. Next, the deck is slid rearwardly, using hydraulic slideback cylinders 9b, down the incline and relative to the subframe, until the rear portion 11d of the deck contacts the ground. Now, load 80, such as a disabled vehicle, may be driven or winched up the deck incline using winch 90. The load is then secured to the bed, using chains, straps and/or similar equipment. After securing the load on the deck, the deck is slid forward and up the incline, relative to the subframe, to its fully forward or retracted position. Finally, the subframe/deck combination is now rotated counterclockwise back to a horizontal position (FIG. 15C).

Figure 11:
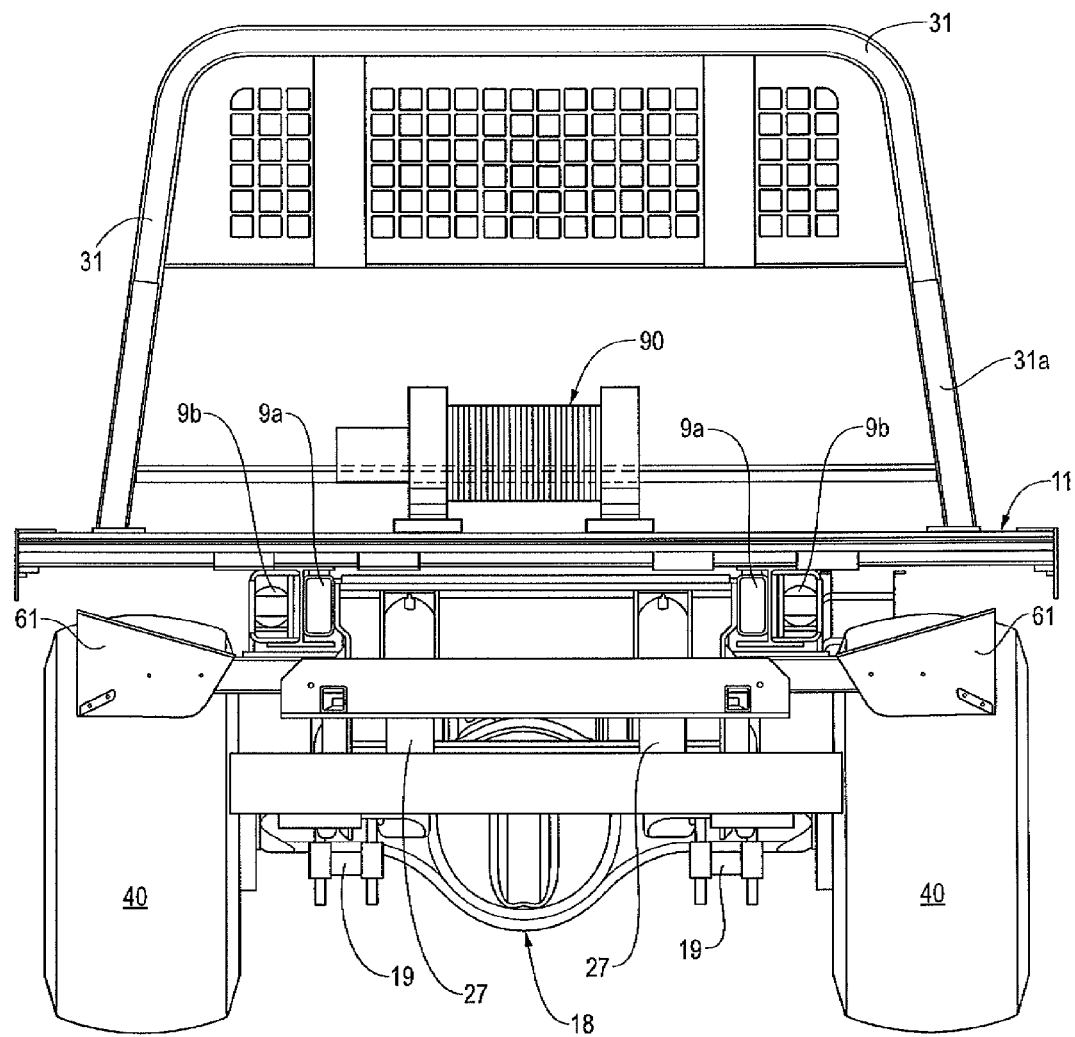
FIG. 11 is a rear, enlarged perspective view of the preferred carrier shown in FIG. 5.
Figure 12:
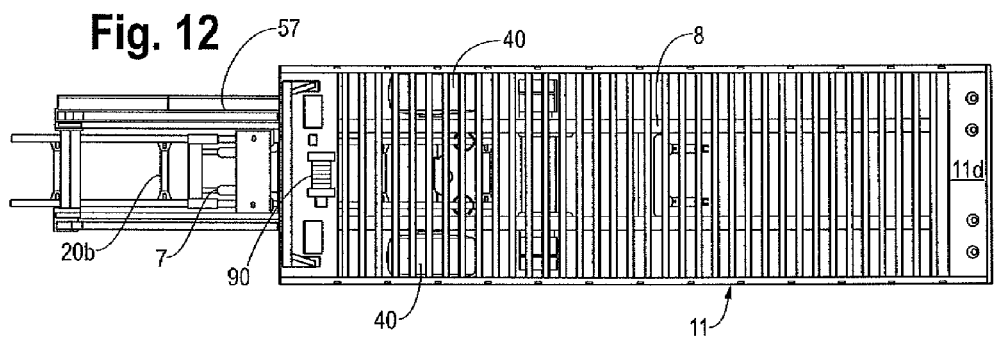
FIG. 12 is a top perspective view similar to FIG. 8, showing the platform subframe slid rearwardly along the chassis.
Figure 14:
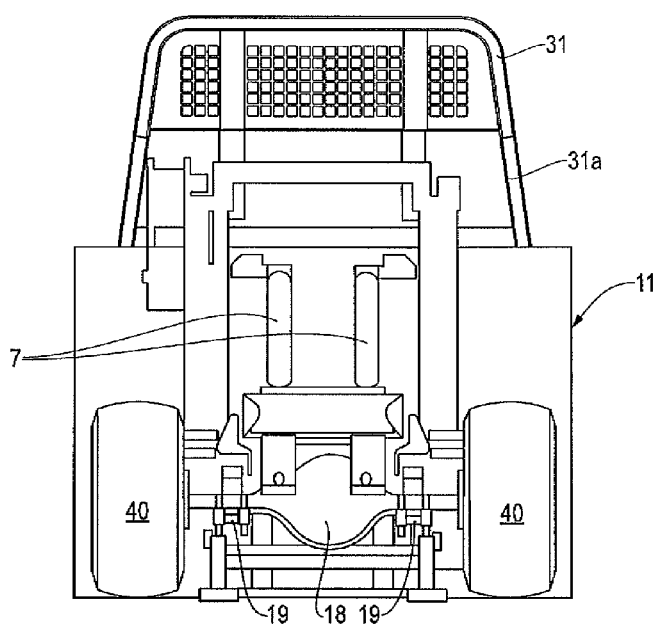
FIG. 14 is a front perspective view of the preferred heavy-duty carrier shown in FIG. 5.

Referring to FIGS. 6, 7, 14 and 22, rear axle airbag suspension 17 is preferably employed. Differential housing 18 lies adjacent thereto. Referring to FIGS. 10, 11 and 14, U-bolt axle shackle 19 may be used to hold the axle to the suspension. With prior carriers (e.g., as shown in the '147 patent), the subframe slide rails were required to sit completely above the chassis frame. However, because this embodiment of the current invention uses a chassis with Super Single wheels, together with a rear axle airbag suspension, approximately 12 inches of clear space is provided between rear wheels 40 and truck frame rails 20a, so that there is room to position subframe rails 9a and slideback cylinders 9B parallel to vehicle chassis rails 20a, and interposed between chassis rails 20a and rear wheels 40, and below the top of the truck frame. (Conventional leaf spring suspensions are mounted on the side of the truck frame, and would interfere with the location of the bed rails.) This additional five inches of space between the Super Single rear tires and truck frame thus provided, over conventional tires, enables positioning of a carrier's longitudinal slide beams adjacent the side of the truck frame to lower the subframe and sliding platform approximately 6 inches relative to the top of the truck frame. This enables the platform height to be lowered at least 6 inches below its previous height relative to ground, as compared to the '147 patent, for example.

Referring to FIGS. 16-21, a tandem rear-axle carrier with dual pairs of rear wheels 40a and 40b is shown. This embodiment is similar to the embodiment shown in the earlier figures, with the exception that tandem rear wheels are employed with corresponding tandem suspensions.

Figure 22:
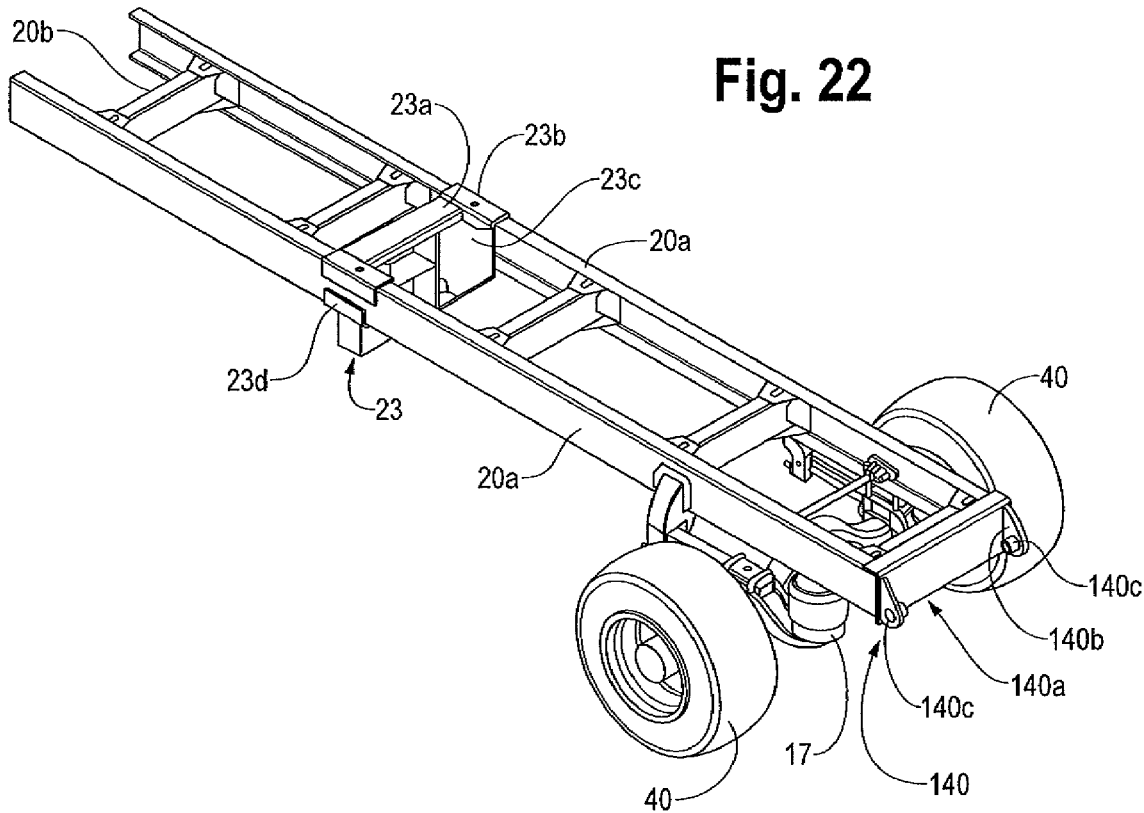
FIG. 22 is a top and side perspective view of a heavy-duty vehicle chassis according to an embodiment of the invention, shown without the subframe mounted on the chassis.

Referring to FIG. 22, in a preferred embodiment, chassis hinge weldment 140 may be welded rigidly to vehicle chassis frame rails 20a. Hinge weldment 140 may include: hinge angle 140A, spanning the chassis frame rails; opposing hinge plates 140B welded to hinge angle 140A; and hinge bushings 140C, each housed in hinge plates 140B. The chassis hinge weldment is the means by which the subframe pivotally attaches to the chassis. Also, the cylinder box 8c (see FIGS. 6, 6A, 6B and 6E) is the means by which the tilt cylinders pivotally attach to the subframe. The chassis hinge and the subframe hinge may be concentrically mated.

Referring to FIGS. 13 and 22, tilt cylinder saddle 23 is the means by which tilt cylinders 7 attach to the chassis. Subframe 8 (hinge plate 63 and bushings 43 shown in FIG. 6A) pivots about the vehicle chassis on chassis hinge weldment 140, which functions as a common concentric pivot point. Elements 23a-23d combine to form a preferred saddle 23 for mounting tilt cylinders 7: cross plate 23a in the saddle weldment; reinforcement channels 23b for the saddle; sideplate 23c of the saddle; and reinforcement gussets 23d, which aid in attaching the saddle to the truckframe).

Figure 23:
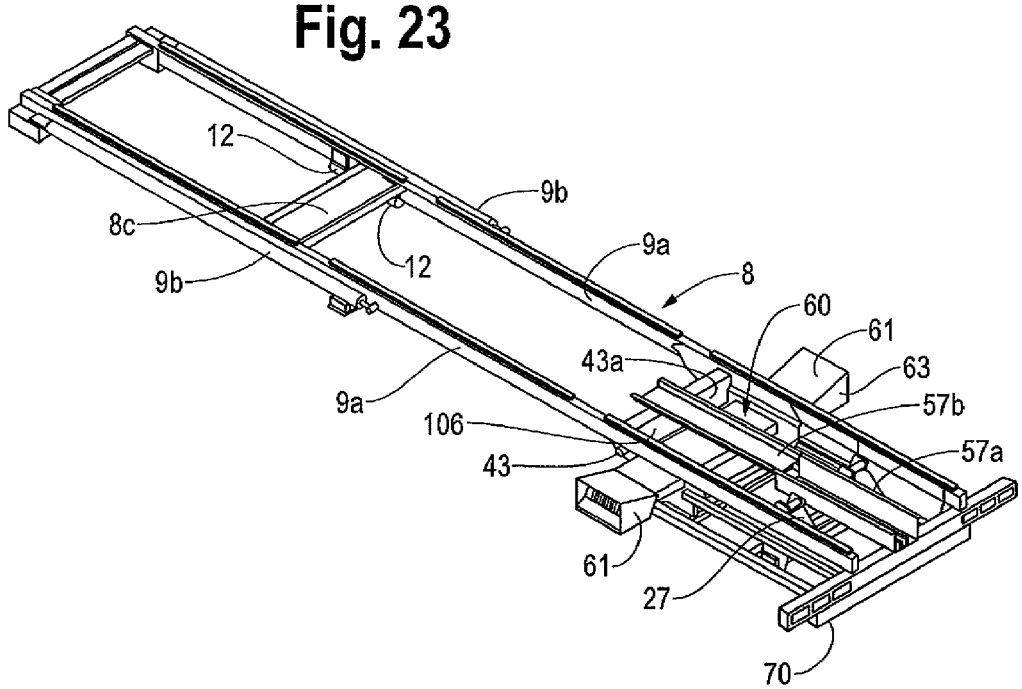
FIG. 23 is a top and side perspective view of the subframe, similar to FIG. 6, and including a preferred rear hose trough with multiple bays.
Figure 24A:
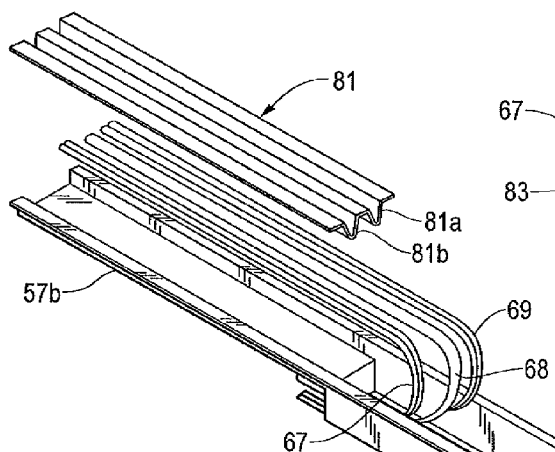
FIG. 24A is an enlarged, exploded top and side perspective view of the hose trough with multiple bays shown in FIG. 24.
Figure 24D:
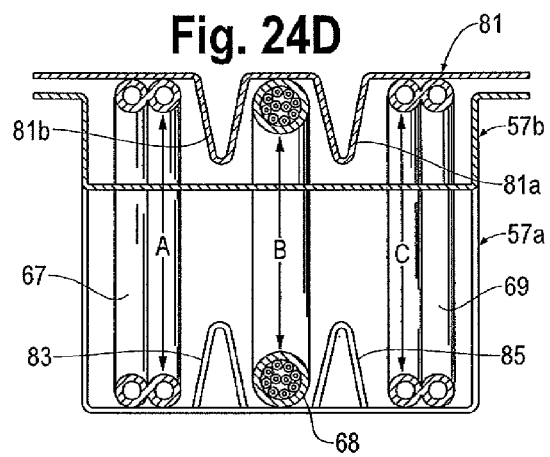
FIG. 24D is a sectional view along reference line 24D-24D of FIG. 24B.
Figure 24B:
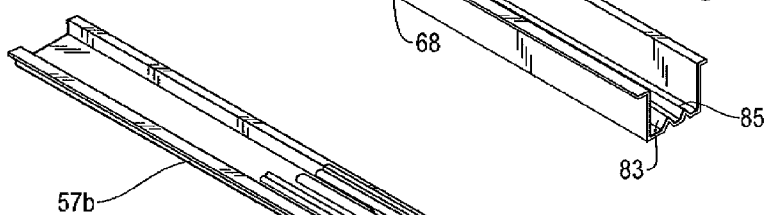
FIG. 24B is a view similar to FIG. 24A with the body plate in normal, retracted position.
Figure 24C:
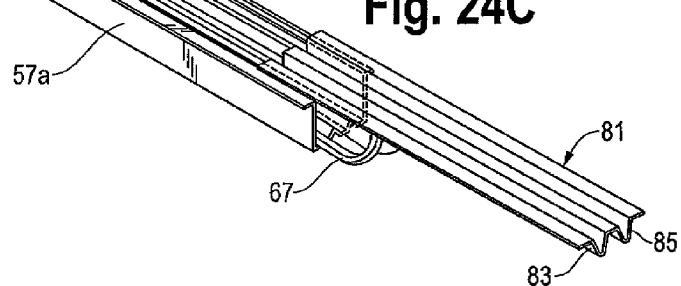
FIG. 24C is a top and side perspective view of the preferred hose trough in an extended position.

Referring to FIG. 6A, winch hydraulic hoses (not shown) may be retained within hose trough 57 located at a forward portion of the subframe. This hose trough location may limit the length of the bed to longer-length beds, however, and may also limit the ability to route electrical cable. Referring to FIGS. 23-24, in a particularly preferred embodiment, it is preferred that a hose trough 57 be located to the rear of the carrier as shown, for example, so that the hose trough will not interfere with the rear tires on beds shorter than 28-feet in length and having a tandem rear axle chassis. Using the embodiment shown in FIGS. 23 and 23A-23D (as opposed to the FIG. 6A embodiment), the bed can be made shorter (industrial carrier beds may vary from about 24-30 feet in length, for example). Rear and front hose trough trays 57a and 57b enable the winch hose lines to move relative to the subframe as the winch and platform move relative to the subframe. Front tray 57a is shallow, to prevent the hoses from sagging and drooping while the bed is in a retracted/forward position. Rear tray 57b is deeper, to account for the hose bend radius. (When the platform is extended, the hoses will lay in the rear tray; when platform is retracted, the hoses will lay in the front tray.) V-shaped dividers 81a, 81b of plate 81 may be provided, to partition the hoses and wires into three separate bays (bay or partition areas A, B and C in FIG. 24D, for example) and to keep them in a straight path when pushed by extending the platform. Plate 81 may be rigidly fastened to the platform. When the platform is extended rearwardly, plate 81 moves with the platform. Rear tray 57a may also be provided with inverted dividers 83 and 85, also forming three separate bays between them for carrying hoses and wires. The use of a hose trough with front and rear trays, each having multiple bays, enables the carrying of multiple hose lines, including for example: oil lines for the winch or other hydraulic device; electrical cable for marker lights and/or emergency lighting; and pressurized air lines for, e.g., the air-activated cable tensioner, to disengage and re-engage the winch, or for other purposes.

Referring again FIGS. 24A-24D, the dividers form the separate bays and provide a straight-line path for the hoses and wires as they are rolled and unrolled with the extension and retraction of the platform. Without the dividers, the hoses and wires would not travel in a straight-line path and would become tangled.

Referring back to FIGS. 6, 6A-6E and 18, a variety of devices may be connected to the rear end of subframe 8. In the drawings, a dock leveling, hydraulic stabilizer 70 is shown to provide strength and stability when level-loading from a dock. Stabilizer 70 may be rotated about pivot 71 using hydraulic cylinders 27. The stabilizer may be used to provide support for the bed as a disabled vehicle is loaded on the platform. Alternatively, instead of or in combination with a hydraulic stabilizer, a wheel lift (as shown in FIG. 18), pintle hitch (for pulling a trailer) or other devices may be attached to the rear end of the subframe.

As perhaps best shown in FIGS. 32-33, in the preferred embodiment of the present invention, the carrier has a design configuration in which the top of the vehicle/chassis rails 120a is preferably above the bottom of at least one of the subframe rails 108a and the bed/platform rails 111a, and preferably above the bottom of both the subframe rails and the bed/platform rails.

Those of ordinary skill in the art will understand that a carrier designed according to the principles of the present invention will have a lowered platform height in comparison to conventional carriers having a subframe located above the frame rails of the vehicle chassis. This, correspondingly, will result in a reduced loading angle, and an increase in payload height. For example, for a carrier with a 28-feet deck, it was found that a 6-inch drop in the platform/deck height results in about a 1.5° reduction in load angle. Use of an airbag suspension, over a leafspring suspension, lowers the deck height about 2.5 more inches, reducing the load angle about another 0.5° (again, for a 28-foot deck). Thus, the present invention, with a carrier having a 28-foot deck using Super Single rear wheels, an airbag suspension, and a subframe located between and below the top of the vehicle chassis frame rails of the vehicle chassis and the rear wheels, provides a load angle reduction of about 2°. Preferably, also, at least a portion of the subframe rails are located below the vehicle chassis frame rails.

The LCG carrier design was originally developed in a heavy-duty version. Design characteristics of the heavy-duty version, disclosed above, include dual outboard mounted bed slideback cylinders, Super Single wheels, an air-bag rear suspension, and a center-mounted hose and wire tray. The outboard mounted slideback cylinders in combination with the Super Single wheels and air bag suspension enable the main subframe slide-rails, in the preferred embodiment, to be positioned mostly below (about 67% below) the top of the truck frame. The Super Single wheel system provides about 12 inches of space between the tire sidewalls and the side of the truck frame, which allows room for the outboard mounted slideback cylinders together with the bed slide-rails between the tires and truck frame. This LCG subframe slide-rail orientation relative to the truck frame enables a much lower bed height than conventional carriers, whose subframe slide-rails are located completely (100%) above the top of the truck frame. The heavy-duty LCG deck height reduction, as compared to conventional heavy-duty carriers, is 6-7 inches, which is significant in terms of providing a lower center of gravity and a lower load angle, as explained above.

This LCG carrier design on heavy duty chassis stimulated demand for a light-duty and medium-duty LCG carrier version. However, the Super Single wheel system is not currently available on light-duty and medium-duty chassis. Therefore, another LCG design was developed for dual rear-wheel chassis to satisfy the additional demand, as now disclosed.

In the preferred embodiment, the design characteristics of the light and medium-duty LCG carriers may include a subframe with a low profile, center-mounted slideback cylinder system with hose and wire trays that straddle the bed slideback cylinder. The slideback cylinder and hose/wire trays may be contained within the confines of the main subframe slide-rails. The main subframe slide-rails may be positioned about 20% below the top of the truck frame, between the dual rear tire side walls and the sides of the truck frame. With typically 7 inches of space available, there is not enough room between the dual rear tires and the truck frame for the slideback cylinder and the slide-rails on the subframe and bed to reside. However, there is just enough space for the slide-rails without the slideback cylinder. Accordingly, in the preferred embodiment, the slideback cylinder is center-mounted.

Figure 26:
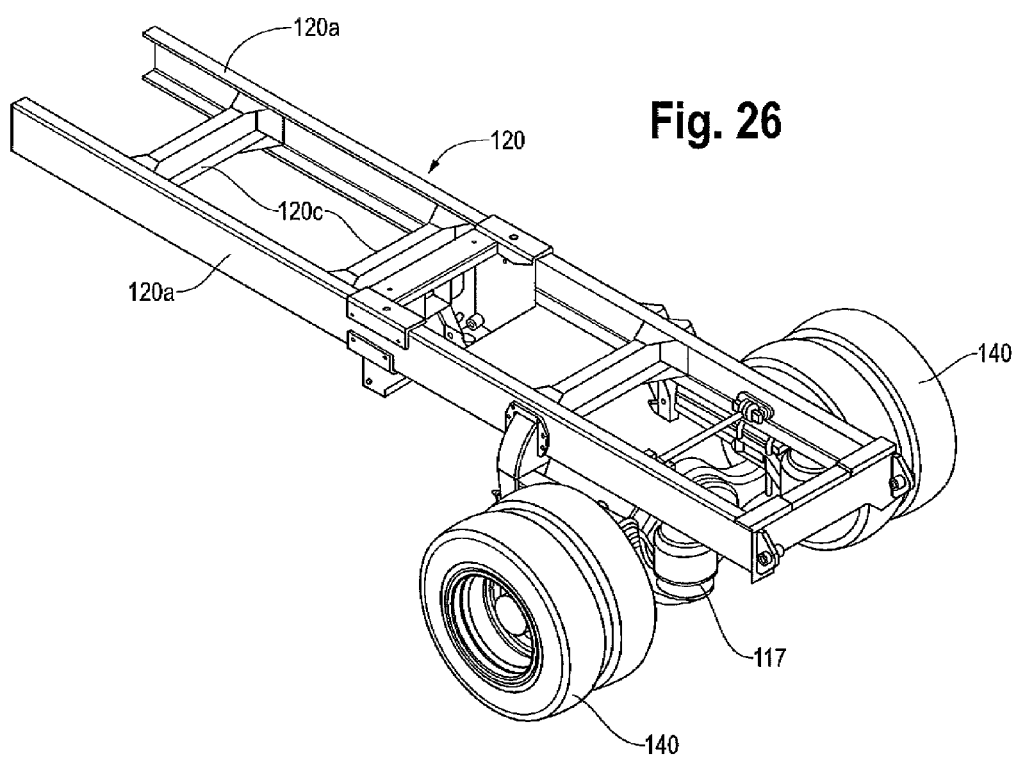
FIG. 26 is a top and side perspective view of a vehicle chassis for one preferred embodiment of an alternative light/medium duty, dual-rear-wheeled chassis, with airbag suspension.

Single rear-axle chassis with air-bag rear suspensions are recommended for the light-duty and medium-duty LCG carriers (as shown in FIGS. 22 and 26), but not required. The air-bag rear suspensions enable a lower load angle with the air-bags deflated, than leaf-spring suspensions. Leaf-spring hanger geometry varies from one chassis manufacturer to the next. Some leaf spring rear suspensions will work with the light and medium-duty LCG carriers as long as the rear suspension spring hangers are not too close to the top of the truck frame.

In the preferred embodiment described here and in the accompanying drawings (FIGS. 27-30), the light and medium-duty LCG carriers have a deck height that is about 4-5 inches lower than comparable conventional carriers.

Referring more specifically now to FIGS. 25-31, a preferred embodiment of a light or medium-duty LCG carrier 300, according to the present invention, is shown. Carrier 300 generally includes tiltable platform 111 and supporting subframe 108, which may be positioned adjacent to and attached to vehicle chassis 120 as explained above. Referring to FIGS.

25 and 26, truck frame 120 may include longitudinal truck frame rails 120a and supporting cross-rails 120c.

Referring to FIGS. 25-29, dual rear wheels 140 may be mounted on a single axle as shown. Subframe 108 with subframe side rails 108a may be positioned, in novel fashion, between rear wheels 140 and vehicle chassis rails 120a, enabling the subframe to be located nearer to the ground than previously possible. Slideback cylinder 109 and front and rear hose/wire trays 157a, 157b are preferably contained between main subframe slide rails 108a. Referring to FIG. 18, as with the above-described heavy-duty chassis, wheel lift 170 may be rotated about pivot 171 using hydraulic cylinders 127.

Referring to FIGS. 28-33, in the preferred embodiment, main subframe slide rails 108a are positioned about 20% below the top of the truck frame, between the dual rear tire side walls and the sides of the truck frame. Dual rear wheels typically provide about 7 inches of space in this area, which may not be enough room for both the slideback cylinder 109 and subframe siderails 108a to be located, which is why slideback cylinder 109 is center-mounted as shown.

Preferably, platform/bed 111 is slidable relative to subframe 108, and is also slidable relative to vehicle chassis 120, in the same manner as with the heavy duty carrier embodiment disclosed in FIGS. 5-21.

Referring to the light duty chassis carrier of FIGS. 27 and 28, the tiltable function of subframe 108, and thus the tiltable function of deck 111 mounted to it, also occurs in the same manner as with the heavy duty LCG carrier embodiment disclosed above, using tilt cylinders 107.

Referring to FIGS. 27 and 31, for example, a pair of control stations 161 may be attached to the subframe 108, in the same manner as with the heavy-duty LCG carrier, if so desired.

The appropriate sequence for loading the light/medium-duty LCG carrier is the same as the loading sequence for the heavy-duty LCG carrier, recited above.

Figure 25:
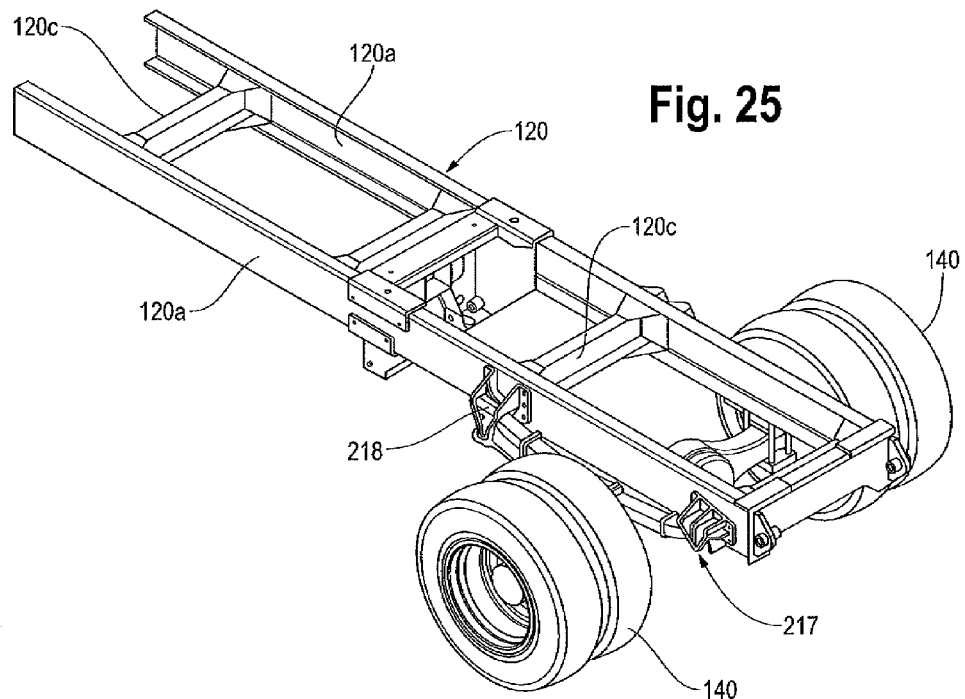
FIG. 25 is a top and side perspective view of a vehicle chassis for one preferred embodiment of an alternative light/medium duty, dual-rear-wheeled chassis, with leafspring suspension.

Referring now to FIG. 26, airbag suspensions are recommended, but not required, for the light/medium-duty LCG carrier using a dual rear wheel chassis. Rear axle airbag suspension 117 enables a lower load angle with the airbags deflated than with leaf spring suspensions. Referring to FIG. 25, some leaf spring rear suspensions 217 may work with light and medium-duty LCG carriers, provided the rear suspension spring hangers 218 are not located too close to the top of the truck frame.

Using the design of the present invention, the resulting deck height of light and medium-duty LCG carriers may be 4-5 inches lower than comparable conventional carriers.

Those of ordinary skill in the art should appreciate that chassis manufacturers prefer not to manufacture carriers with Super Single rear wheels with truck frames that have rear single axles. Instead, rear tandem axles are preferred to be used with Super Single rear wheels. (Only in this sense, FIGS. 5-15C do not show a currently preferred embodiment; instead, where Super Singles are shown, tandem rear axles should be employed, as with FIG. 16, for example.) (Single rear axles may be rated at 21,000 pounds, for example, and each Super Single wheel may be rated at a 10,000 pound capacity, meaning the rear axle may be loaded to capacity, which can overload the tires. This is not preferred by manufacturers.)

The above description is not intended to limit the meaning of the words used in the following claims that define the invention. Persons of ordinary skill in the art will understand that a variety of other designs still falling within the scope of the following claims may be envisioned and used. For example, while preferred embodiments involving a slidable and tiltable platform have been disclosed, in other embodiments the platform need not be capable of sliding. As another example, it is possible that future modifications in designs, or future improvements in materials, may enable the use of the invention with dual rear wheels as opposed to Super Single rear wheels (i.e., such design modifications and/or improvements may result in their being sufficient space between the vehicle chassis rails and the dual rear wheels such that the subframe may be located in this space). It is contemplated that future modifications in structure, function, or result will exist that are not substantial changes and that all such insubstantial changes in what is claimed are intended to be covered by the claims.

We claim:

1. A vehicle carrier for loading and unloading disabled vehicles, comprising:
   a motorized truck having an operator compartment and a primary vehicle frame with frame rails and rear wheels supported by a rear axle suspension;
   a subframe mounted to the vehicle frame of the vehicle carrier, the subframe:
      (a) comprising a second frame supported by the vehicle frame;
      (b) supporting a slidable platform mounted to the subframe which may be used to carry the disabled vehicles, the platform being slidable in a generally horizontal direction relative to the subframe;
      (c) having subframe rails interposed between the vehicle frame rails and the rear wheels of the vehicle frame; and
      (d) being tiltable relative to the vehicle frame chassis; and
   wherein the interposition of the subframe rails between the vehicle frame rails of and the rear wheels enables a lowered platform height and an increase in payload height in comparison to other vehicle carriers whose subframe rails are located above their vehicle frame rails.

2. The vehicle carrier of claim 1, wherein the platform is supported by platform rails, and at least a portion of the platform rails are located below the top of the vehicle frame rails.

3. The vehicle carrier of claim 1, wherein at least a portion of the subframe rails are located below the vehicle frame rails.

4. The vehicle carrier of claim 1, wherein the payload height is increased by about 4-5 inches from that of other vehicle carriers whose subframe rails are not located between the vehicle frame and the rear wheels.

5. The vehicle carrier of claim 1, wherein the rear axle suspension comprises an airbag suspension.

6. The vehicle carrier of claim 1, wherein the rear axle suspension comprises a leaf spring suspension.

7. The vehicle carrier of claim 1, wherein the rear wheels comprise either dual rear wheels or a single wide rear wheels.

8. The vehicle carrier of claim 1, wherein a top surface of the platform defines a load angle with respect to the ground which is reduced from that of the other vehicle carriers whose subframe rails are not located between the vehicle frame and the rear wheels, by about 2°.

9. The vehicle carrier of claim 1, wherein the subframe is tiltable using at least one hydraulic tilt cylinder located between the subframe rails.

10. The vehicle carrier of claim 9, wherein the platform is slidable using at least one additional hydraulic cylinder.

11. The vehicle carrier of claim 10, wherein the at least one additional hydraulic cylinder comprises a slideback cylinder located between the subframe rails.

12. The vehicle carrier of claim 10, wherein the at least one additional hydraulic cylinder comprises a pair of slideback cylinders mounted along the subframe rails.

13. The vehicle carrier of claim 1, further comprising a winch for facilitating loading of a disabled vehicle onto the platform.

14. The vehicle carrier of claim 13, wherein oil supplied for use by the winch is supplied by a pair of hoses carried by one or more hose troughs located to the rear of the carrier.

15. The vehicle carrier of claim 1, further comprising a hose trough including two or more bays, wherein the bays carry two or more hoses carrying at least one of the following items: oil; electrical wiring; or pressurized air.

16. The vehicle carrier of claim 15, wherein the hose trough is located at the rear of the carrier.

* * * * *